United States Patent [19]

Wada et al.

[11] Patent Number: 5,595,773
[45] Date of Patent: Jan. 21, 1997

[54] METHOD FOR PREPARING FROZEN BAKER'S DOUGH

[75] Inventors: Kimihito Wada, Amagasaki; Koji Tsukuda, Kishiwada, both of Japan

[73] Assignee: Matsutani Chemical Industry Co., Ltd., Kyogo-Ken, Japan

[21] Appl. No.: 527,213

[22] Filed: Sep. 12, 1995

[30] Foreign Application Priority Data

Sep. 12, 1994 [JP] Japan .................................. 6-244773

[51] Int. Cl.$^6$ .............................. A21D 2/36; A21D 8/02; A21D 8/04
[52] U.S. Cl. ................... 426/20; 426/52; 426/549
[58] Field of Search ..................... 426/549, 524, 426/52, 20, 496

[56] References Cited

U.S. PATENT DOCUMENTS

| | | | |
|---|---|---|---|
| 4,885,180 | 12/1989 | Cochran et al. | 426/241 |
| 4,973,447 | 11/1990 | Seib et al. | 426/549 |
| 5,171,590 | 12/1992 | Sluimer | 426/549 |
| 5,254,351 | 10/1993 | de Boer et al. | 426/549 |
| 5,362,510 | 11/1994 | Mizoguchi et al. | 426/549 |

FOREIGN PATENT DOCUMENTS

| | | | |
|---|---|---|---|
| 4-141041 | 5/1992 | Japan | A21D 6/00 |
| 4-141042 | 5/1992 | Japan | A21D 6/00 |
| 4-158731 | 6/1992 | Japan | A21D 8/04 |
| 4-234938 | 8/1992 | Japan | A21D 2/16 |
| 5-15296 | 1/1993 | Japan | A21D 2/36 |
| 5-252858 | 10/1993 | Japan | A21D 2/18 |
| 5-292872 | 11/1993 | Japan | A21D 8/04 |

*Primary Examiner*—Arthur L. Corbin
*Attorney, Agent, or Firm*—Sughrue, Mion, Zinn, Macpeak & Seas

[57] ABSTRACT

A method for preparing frozen baker's dough comprises the steps of blending ingredients for preparing bread including raw grain flour, 1 to 7 parts by weight of a processed starch per 100 parts by weight of the raw grain flour and 300 to 1000 units of a starch decomposition enzyme per 1 kg of the raw grain flour, the processed starch having a hot water solubility of not more than 8% by weight, a ratio of a cold water swelling power (Sc) to a hot water swelling power (Sh), Sc/Sh, ranging from 1.2 to 0.8 and a cold water swelling power ranging from 4 to 15, to thereby form a mixture; kneading the mixture while adding water to form a dough; and then freezing the dough.

9 Claims, No Drawings

5,595,773

METHOD FOR PREPARING FROZEN BAKER'S DOUGH

BACKGROUND OF THE INVENTION

The present invention relates to a method for preparing frozen baker's dough and more specifically to a method for preparing frozen baker's dough which permits the production of bread exhibiting excellent properties comparable to those observed for the bread prepared by the usual integrated work.

Various kinds of bread have been known and all kinds of bread must be produced every day in order to supply fresh products to the consuming public. Accordingly, it is inevitable to produce various kinds of bread in small amounts. However, if bread having various properties comparable to those observed for the bread produced by the usual integrated work can be obtained using frozen baker's dough which has been prepared in advance and frozen and stored in the frozen state, it will be possible to mass-produce baker's dough, store it in the frozen state, thaw a necessary quantity thereof at a desired time and continue the subsequent processes required for the production of bread to produce a desired quantity of bread. In other words, fresh bread can always be supplied to the consuming public while making the production schedule in bread-baking factory smooth.

However, the use of such frozen baker's dough suffers from various problems. For instance, ① a quite long proof time is required, ② the volume of the resulting bread is reduced, ③ the walls of foams present in the crumb of the bread become thicker and thus the bread has bad taste and texture, ④ the crust of the bread has a rough surface and ⑤ the bread has a distorted shape, as compared with the bread prepared by the usual integrated work.

It has been believed that the foregoing drawbacks are caused by the deterioration of yeast due to freezing; the effect of reducing substances released from the deteriorated yeast; and the destruction of the structure of the dough by the degeneration of gluten through freezing and the breakage of the gluten membrane due to the formation of ice or crystallization of water [Yasuo TANAKA, Toshiaki NAKAE, "REITO KIJI NO RIRON TO JISSAI (Theory and Practice of Frozen Dough)", for instance, p. 17 (1982), Published by SHOKKEN SENTAR (Food Research Center)].

To eliminate these drawbacks, there have been known methods which comprise reducing the amount of water to be supplied to baker's dough; increasing the amount of yeast; using freeze-resistant yeast; increasing contents of saccharides such as sugar and fats and oils; and adding an oxidizing agent such as potassium bromate or ascorbic acid. There have also been proposed a variety of methods in addition to those described above.

There have been developed, for instance, a method which comprises adding non-reduced oligosaccharides such as trior higher saccharides and/or reduced oligosaccharides such as dior higher saccharide alcohols (Japanese Un-Examined Patent Publication (hereinafter referred to as "J. P. KOKAI") No. Hei 4-141041); a method comprising adding lactitol (J. P. KOKAI No. Hei 4-141042); a method comprising adding an indigestible polysaccharide and/or a yeast-nonassimilable sugar (J. P. KOKAI No. Hei 5-252858); a method comprising adding a mixture of gelatin with an emulsifier such as enzyme-decomposed lecithin or a monoglyceride (J. P. KOKAI No. Hei 4-234938); and a method comprising adding a hot water-soluble gelling agent (e.g., gelatin) which does not undergo gelation within the final fermentation temperature range of the baker's dough (J. P. KOKAI No. Hei 5-292872).

Moreover, the use of starch has also been proposed. For instance, J. P. KOKAI No. Hei 4-158731 discloses a method comprising adding a cold water-soluble starch and/or lipase. In this patent, the cold water-soluble starch should have a viscosity of not less than a predetermined level on the basis of such an idea that the deterioration of the baker's dough due to freezing can be eliminated by reducing the amount of the free water present therein and pregelatinized potato starch is disclosed as an example thereof. However, this method suffers from various problems such that the use of cold water-soluble starch having such a high viscosity leads to an increase in the stickiness of the resulting dough and this in turn makes the kneading and molding operations difficult and that, in particular, if a starch decomposition enzyme is simultaneously used, the pregelatinized potato starch is first decomposed and the shape retaining properties of the resulting dough is accordingly impaired.

On the other hand, there have been proposed bakery foods which have excellent taste and texture and improved maintenance of quality over a long time period and which can be prepared through the use of processed starch having specific hot water solubility, particle size, cold water swelling power and hot water swelling power (J. P. KOKAI No. Hei 5-15296) and also suggested that this technique may be applied to frozen dough. However, it has been found out, during the studies subsequent thereto, that the use of the processed starch alone is effective only when the resulting dough is stored in the frozen state for a short period of time on the order of not more than about one week, but the freeze resistance thereof is reduced as the freezing time increases.

As has been described above, there have been proposed various approaches and attempts in order to overcome the drawbacks which are encountered when frozen baker's dough is used for baking bread, but none of them have succeeded in the preparation of bread, starting from the baker's dough stored in the frozen state, which have quality comparable to that of the bread produced by the usual integrated work. More specifically, they permit the production of bread having a rich formulation whose quality is approximately identical to that of the bread produced by the integrated work, but have not yet permitted the production of any bread having a lean formulation which shows sufficiently satisfactory quality.

SUMMARY OF THE INVENTION

Accordingly, it is an object of the present invention to provide frozen baker's dough which can solve the problems of, for instance, volume reduction of bread, roughness of the surface of the crust thereof and an increase in the wall thickness of foams present in the crumb thereof, which would be encountered when producing bread starting from frozen baker's dough and which permits the production of bread ensuring excellent taste and texture.

The inventors of this invention have conducted various studies to solve the foregoing problems associated with the conventional techniques for preparing frozen baker's dough, have found out that the problems encountered when the frozen baker's dough is used for the preparation of bread can effectively be solved by simultaneously using a specific processed starch and a specific starch decomposition enzyme and thus have completed the present invention.

According to the present invention, there is provided a method for preparing frozen baker's dough which comprises the steps of blending ingredients for preparing bread including raw grain flour, kneading the mixture while adding water to form dough and then freezing the dough, wherein 1 to 7 parts by weight of a specific processed starch per 100 parts by weight of the raw grain flour and 300 to 1000 units of a starch decomposition enzyme per 1 kg of the raw grain flour are added to the ingredients, the processed starch having a hot water solubility of not more than 8% by weight, a ratio of a cold water swelling power (Sc) to a hot water swelling power (Sh), Sc/Sh, ranging from 1.2 to 0.8 and a cold water swelling power ranging from 4 to 15, and preferably comprising not more than 5% by weight of a fraction which does not pass through a sieve of 60 mesh size.

DESCRIPTION OF THE PREFERRED EMBODIMENTS

The present invention will hereinafter be described in more detail with reference to the preferred embodiments.

The term "baker's dough" used in the present invention means dough produced by adding, to raw grain flour, appropriate amounts of water, common salt, yeast and yeast food as well as minor ingredients commonly used in the preparation of bread such as saccharides such as sugar (sucrose), glucose, isomerized saccharides and oligosaccharides, dairy products such as skim milk powder and whole milk powder, fats and oils such as shortening, margarine and butter, emulsifiers such as glycerin fatty acid esters and sucrose fatty acid esters, spices such as cinnamon and basil, liquors such as brandy and rum, dry fruits such as raisin and dry cherry, nuts such as almond and peanuts, flavors (such as vanilla essence), artificial sweeteners (such as aspartame), dietary fibers (e.g., indigestible dextrin), vital gluten, and cocoa powder and other minor ingredients used depending on the kinds of bread and then mixing and kneading the resulting mixture and specific examples thereof includes those used for preparing, as final products, white bread such as pullman, English bread and one loaf; French bread such as buguette and Parisian; various rolls such as sweet rolls, buns and table rolls; Japanese sweet bread; English muffins; pizza; doughnuts and fritters which are fried in oil.

The raw grain flour used in the preparation of frozen baker's dough of the present invention includes, for instance, wheat flour as the principal ingredient, and rye flour, corn flour, graham flour and rice flour which are optionally used as a part of the principal ingredient, i.e., wheat flour.

The wheat flour may be hard wheat flour commonly used for the preparation of bread and having a protein content ranging from about 11 to 13% by weight and it is also possible to use semihard wheat flour, medium wheat flour and/or soft wheat flour instead of or a part of the hard wheat flour, depending on the kinds of bread. Preferably, hard wheat flour is used alone or in combination with other wheat flour listed above. Moreover, the freeze resistance of the resulting dough can further be improved if the raw grain flour comprises, in addition to wheat flour, 10 to 40% by weight of super hard wheat flour having a protein content of not less than 14% by weight.

In the present invention, the frozen baker's dough comprises processed starch having a hot water solubility of not more than 8% by weight, preferably not more than 6% by weight, a content of the fraction which does not pass through a sieve of 60 mesh size of not more than 5% by weight, a ratio of a cold water swelling power (Sc) to a hot water swelling power (Sh), Sc/Sh, ranging from 1.2 to 0.8 and a cold water swelling power ranging from 4 to 15.

If the hot water solubility of the processed starch exceeds 8% by weight, there is not observed any effect of eliminating the damage of the frozen baker's dough due to freezing. If the content of the fraction, which does not pass through a sieve of 60 mesh size, exceeds 5% by weight, the resulting bread lacks the surface smoothness. Moreover, if the ratio of the cold water swelling power to the hot water swelling power is outside the foregoing range of from 1.2 to 0.8, or if the cold water swelling power is outside the foregoing range of from 4 to 15, the resulting frozen baker's dough is insufficient in the effect of eliminating deterioration thereof observed when the baker's dough is frozen. Therefore, the processed starch used in the present invention should satisfy all of the foregoing requirements.

Such processed starch can be prepared according to, for instance, the method disclosed in J. P. KOKAI No. Hei 5-15296 (=U.S. Pat. No. 5,362,510). More specifically, the processed starch can be prepared by first crosslinking commercially available starch, preferably at least one member selected from the group consisting of potato starch, sweet potato starch and sago starch, in particular, potato starch as an ingredient to give crosslinked starch.

The crosslinked starch may be one obtained by simply reacting, on the starch, a crosslinking agent such as trimetaphosphate, phosphorus oxychloride or epichlorohydrin according to the usual method, but preferred are crosslinked starch esters or crosslinked starch ethers obtained through esterification or etherification and crosslinking reactions. The degree of crosslinking of the starch is such that the concentration of the starch solution whose viscosity is equal to about 500 mPa·s (at 50° C.) ranges from 10 to 17% by weight, when the starch is heated up to 90° C., then cooled down to 50° C. and the viscosity thereof is determined using a Brookfield type viscometer. Moreover, the esterification or etherification is carried out in such a manner that the degree of substitution (DS: this means the number of substituents per glucose residue of starch) of the starch falls within the range of from 0.01 to 0.25. The esterification or etherification per se can be performed by the usual method and wide variety of conventional esterifying agents or etherifying agents may be used in the esterification or etherification. More specifically, if the DS value is less than 0.01, the effect achieved by the esterification or etherification is insufficient, while if it exceeds 0.25, any further improvement in the effect is not expected, the gelatinization temperature is reduced and this in turn makes the handling thereof difficult.

Then the crosslinked starch can be converted into an aqueous slurry having a concentration ranging from about 10 to 40% by weight, followed by heating the aqueous slurry at a temperature between at least about 27° C. greater than the swelling initiation temperature as determined at a slurry concentration of 20% by weight using a Brabender amylograph and about 130° C. to give the desired processed starch used in the present invention. The processed starch is preferably dried to give a powdery product through, for instance, spray drying or drum drying from the viewpoint of keeping quality and facilities for use.

Incidentally, the particle size, cold water swelling power, hot water swelling power and hot water solubility of the processed starch used in the present invention are determined by the following methods, respectively.

<Particle Size>

A sample is dispersed in water to give a 5% by weight aqueous dispersion, then the dispersion is allowed to stand at 25° C. for 30 minutes, thereafter classified by passing the dispersion through a 250 micrometers test sieve and the dry weight of the particles remaining on the sieve is expressed in terms of percentage with respect to the oven-dry weight of the sample used.

<Cold Water Swelling Power>

About 1 g of a sample (dry basis) is dispersed in 100 ml of water maintained at 25° C., followed by gentle stirring of the resulting dispersion in a thermostatic chamber maintained at 25° C. for 30 minutes and centrifugation of the dispersion (at 3000 rpm for 10 minutes) to thus separate the resulting gel phase from the supernatant. Then the weight of the gel phase is determined, which is regarded as A. Then the weighed gel phase is heated to dryness (at 105° C., till a constant weight is reached), followed by determination of the weight thereof, which is regarded as B. The cold water swelling power is herein defined to be A/B.

<Hot Water Solubility; Hot Water Swelling Power>

A sample (1.0 g as expressed in terms of the oven-dry weight) is dissolved in 100 ml of water, followed by heating the dispersion at 90° C. for 30 minutes and separation of the resulting gel phase from the supernatant through centrifugation (at 3000 rpm for 10 minutes) immediately after the heating. Then the weight of the gel phase is determined and it is regarded as C. Then the weighed gel phase is heated to dryness (at 105° C., till a constant weight is reached), followed by determination of the weight thereof, which is regarded as D. The hot water swelling power is herein defined to be C/D. On the other hand, the volume of the supernatant obtained at this state is determined and all of the saccharides present in the supernatant is quantitatively analyzed by the phenol-sulfuric acid method to thus evaluate the hot water solubility.

In the present invention, a starch decomposition enzyme (an amylase) is used along with the foregoing processed starch. Examples of the starch decomposition enzyme herein used are α-amylase, β-amylase and glucoamylase irrespective of the origins thereof. These amylases may be used alone or in combination. Specific examples thereof preferably used herein are those commercially available under the trade name of, for instance, Kokulase® (available from Sankyo Co., Ltd.), Glucozym® DB (available from Nagase Biochemical Industries Co., Ltd.), Softdough-K® (available from Sankyo Foods Co., Ltd.) and Malt Powder® (available from Oriental Yeast Co., Ltd.).

The frozen baker's dough of the present invention can be prepared by adding the foregoing processed starch and the starch decomposition enzyme to ingredients during the process for mixing the latter, kneading the mixture while adding water to give dough and then freezing the resulting dough. In this respect, the processed starch is added to the ingredients in an amount ranging from 1 to 7 parts by weight and preferably 1 to 5 parts by weight per 100 parts by weight of the raw grain flour. If the added amount thereof is outside the range defined above, the resulting baker's dough is insufficient in the freeze resistance.

In addition, the starch decomposition enzyme is used in an amount ranging from 300 to 1000 units and preferably 300 to 800 units per 1 kg of the raw grain flour. This is because if it is less than 300 units, the resulting dough is insufficient in the freeze resistance, while if it exceeds 1000 units, the resulting dough is excessively softened upon thawing and this conversely leads to the production of bread having a reduced volume and poor taste and texture.

As to commercially available starch decomposition enzymes, the ability of decomposing starch, i.e., the activity thereof varies from product to product. Therefore, each commercially available enzyme should be used in an amount which corresponds to the units defined above on the basis of the unit weight of the raw grain flour while determining the activity thereof according to the method specified in JIS K7001.

The present invention can be applied to any methods for preparing bread commonly employed in this field such as the sponge dough method and the straight dough method. In any case, the processed starch and the starch decomposition enzyme are basically added during the process for mixing ingredients, but they are added during the main kneading step in the sponge dough method. The addition of these substances may be carried out by forming a premix with at least one ingredient or a part thereof prior to the addition thereof to other ingredients or they may be added by simultaneously combining and mixing all of the ingredients including the processed starch and the enzyme or by adding and mixing, in order, the ingredients.

After mixing the raw materials for preparing bread including the processed starch and the starch decomposition enzyme, water is added to the resulting mixture, followed by kneading the mixture to give dough. In this respect, the added amount of water used in the present invention is increased in proportion to the added amount of the processed starch. More specifically, it is increased in an amount greater than that required in conventional dough-forming method (i.e., the method wherein the processed starch is not used) by about 3 to 4 parts by weight per one part by weight of the processed starch. Such an increase in the added amount of water makes the formation of dough easy and does not exert any adverse effect on the moldability of the dough. Moreover, to increase the amount of added water is in contradictory to the conventional conception concerning the deterioration of baker's dough due to freezing, for instance, such a conception that the greater the amount of free water, the higher the degree of deterioration of dough due to freezing as disclosed in J. P. KOKAI No. Hei 4-158731, but the problem of the deterioration of dough through freezing can be solved by such a method in the present invention although the reason why the method is effective is not clearly elucidated.

The kneaded dough is appropriately divided into pieces and then frozen, or divided into pieces, formed into a desired shape and then frozen. The dough is frozen in an air blast type freezing apparatus such as a tunnel type, belt type or fluidized bed type freezing apparatus or by allowing to stand in a freezer and then stored in the frozen state. In this respect, the dough is desirably frozen at a temperature ranging from −35° to −45° C. and the frozen dough is desirably stored at a temperature ranging from −20° to −24° C.

The frozen baker's dough stored while maintaining its frozen state can be thawed at a desired time, followed by benching if necessary, fermentation, division and molding into a desired shape, proofing process and finally baking or frying to give a desired product. The thawing of the dough is desirably carried out at a constant temperature, preferably ranging from 0° to 18° C. using a retarder, a dough conditioner (=a kind of retarder having proofing function) or a proofing apparatus.

It has been generally known that the longer the storage time of the dough in the frozen state, the higher the degree of deterioration thereof by freezing, but the frozen baker's dough of the present invention exhibits a conspicuous effect of eliminating the deterioration due to freezing over about 4 weeks and the present invention can be applied to not only the products having rich formulations, but also those having lean formulations such as French bread. Thus, the frozen baker's dough of the present invention ensures the solution of difficult problems of the production planning within a predetermined period of time and continuous supply of fresh bread to the consuming public which has been the desired goals of the frozen baker's dough.

Moreover, the frozen baker's dough of the present invention may further comprises ascorbic acid, potassium bromate and/or fatty acid monoglycerides which have been known to be effective in the preparation of the conventional frozen baker's dough; freeze-resistant bakers' yeast may be used in the dough of the present invention and other conventional techniques for preparing frozen baker's dough may likewise be simultaneously used in the present invention.

The present invention permits the preparation of frozen baker's dough from which bread can be produced without causing various problems conventionally encountered when preparing bread using frozen baker's dough, such that the bread volume is reduced, that the surface of the crust gets rough and that the wall of foams present in the crumb become thicker.

The present invention will hereunder be described in more detail with reference to the following Reference Examples and working Examples, provided that "part" and "%" represent "part by weight" and "% by weight", respectively.

REFERENCE EXAMPLE 1

Twenty parts of sodium sulfate was dissolved in 120 parts of water and then 100 parts of commercially available potato starch was added to the solution to give a slurry, followed by addition of 30 parts of a 4% caustic soda aqueous solution, 4 parts of propylene oxide and 0.1 part (sample No. 1), 0.14 part (sample No. 2), 0.2 part (sample No. 3), 0.4 part (sample No. 4) or 0.8 part (sample No. 5) of epichlorohydrin thereto with stirring, reaction of these compounds at 41° C. for 21 hours, neutralization of the reaction system with the addition of sulfuric acid and washing with water. The concentrations of these samples whose viscosity was about 500 mPa·s at 50° C. were found to be about 8.5%, 10%, 12%, 15% and 16.5% respectively and the swelling-initiation temperature thereof was found to be about 53° C. Then each sample was converted into a 25% aqueous slurry and the slurry was dried by heat-treating in a double drum-dryer whose surface temperature was controlled to 150° C. At this stage, the temperature of the heat-treatment was found to be 102° C. Then each resulting dried product was pulverized to give crosslinked and etherified processed starch of Sample No. 1 to Sample No. 5. Physical properties of these processed starch products are summarized in Table 1. It was found that the degrees of etherification (DS) of these products fell within the range of from 0.08 to 0.85. In Table 1, "swelling power ratio" means the ratio of the cold water swelling power to the hot water swelling power.

TABLE 1

| Sample No. | Hot Water Solubility (%) | Cold Water Swelling Power | Swelling Power Ratio |
| --- | --- | --- | --- |
| 1 | 9.0 | 16.4 | 1.23 |
| 2 | 7.1 | 14.1 | 1.12 |
| 3 | 5.3 | 11.2 | 1.04 |
| 4 | 2.5 | 8.5 | 1.02 |
| 5 | 0.8 | 5.3 | 0.84 |
| 6 | 4.9 | 7.2 | 1.03 |
| 7 | 4.3 | 8.4 | 0.97 |
| 8 | 1.7 | 3.6 | 0.88 |
| 9 | 5.2 | 7.9 | 0.74 |
| 10 | 47.1 | 11.5 | 0.46 |

REFERENCE EXAMPLE 2

To 120 parts of water, there was added 100 parts of sweet potato starch to form a slurry, 0.25 part of sodium trimetaphosphate was added to the slurry while maintaining the pH of the slurry at 11.3 to 11.5 through addition of a 3% caustic soda aqueous solution with stirring, then the reaction thereof was continued at 39° C. for 5 hours, followed by neutralization of the reaction system with sulfuric acid and washing with water. The swelling-initiation temperature was determined and found to be about 68° C. Then the reaction system was converted into a 12% aqueous slurry followed by heating at 97° C. using Onlator® (a continuous stirring kneading heat exchanger manufactured by Sakura Seisakusho Ltd.) and spray-drying the slurry wherein the inlet and outlet temperatures were adjusted to 175° C. and 85° C. respectively to give processed starch (sample No. 6). Physical properties thereof are listed in the foregoing Table 1.

REFERENCE EXAMPLE 3

To 120 parts of water, there was added 100 parts of sago starch to form a slurry, 0.5 part of sodium trimetaphosphate was added to the slurry while maintaining the pH of the slurry at 11.3 to 11.5 through addition of a 3% caustic soda aqueous solution with stirring, then the reaction thereof was continued at 39° C. for 5 hours, followed by adjusting the pH of the reaction system to 9.5 and then cooling it to 25° C. Then the reaction mixture was acetylated by addition of 6 parts of acetic anhydride to the mixture while maintaining the pH thereof at 9.0 to 9.5 through addition of a 3% aqueous caustic soda solution, followed by neutralization of the reaction mixture with sulfuric acid, washing with water and spray-drying in the same manner used in Reference Example 2 to give processed starch (sample No. 7). The degree of acetylation (DS) was determined and found to be 0.068. Physical properties thereof are listed in the foregoing Table 1. The swelling-initiation temperature prior to the heat-treatment was found to be about 64° C.

REFERENCE EXAMPLE 4

The same procedures used in Reference Example 1 were repeated except that tapioca starch was substituted for the raw starch used in Reference Example 1 and that the added amounts of propylene oxide and epichlorohydrin were changed to 8.5 parts and 0.45 part respectively to give processed starch (sample No. 8). Physical properties thereof are listed in the foregoing Table 1.

REFERENCE EXAMPLE 5

The same procedures (till the water washing process through the reaction) used in the preparation of Sample No. 3 of Reference Example 1 were repeated and the reaction mixture was heat-treated under the following conditions to give processed starch (sample No. 9). After water-washing, a 15% by weight aqueous slurry was prepared from the reaction mixture, followed by heating the slurry at 64° C. for 15 minutes and spray-drying it at an inlet temperature of 175° C. and an outlet temperature of 85° C.

In addition, commercially available pregelatinized starch (Matsutani Chemical Industry Co., Ltd.; Matsunorin CM®) per se was used as a sample No. 10. Physical properties thereof are listed in the foregoing Table 1.

EXAMPLE 1

Frozen baker's dough (for one loaf) having the following formulations were prepared using the sample Nos. 1 to 10 listed in Table 1. In the following formulation, the rate of blending of each ingredient is expressed in terms of "part", except for that of Glucozym DB which is expressed in terms of the enzymatic unit per 1 kg of wheat flour.

<Rate of Blending>

|  | Control | Example |
|---|---|---|
| hard wheat flour ("Milling" ®; available from Nissin Flour Mills Co., Ltd.) | 80 | 80 |
| super hard wheat flour ("King" ®; available from Nissin Flour mills Co., Ltd.) | 20 | 20 |
| sample No. 1-10 | — | 2 |
| Glucozym DB ® (available from Nagase Biochemical Industries Co., Ltd.) | — | 600 |
| yeast food | 0.1 | 0.1 |
| ascorbic acid | 0.01 | 0.01 |
| fatty acid monoglyceride | 0.3 | 0.3 |
| sugar | 5 | 5 |
| common salt | 2 | 2 |
| skim milk powder | 3 | 3 |
| shortening | 5 | 5 |
| yeast | 3.5 | 3.5 |
| water | 67 | 73.5 |

First, these ingredients except for water and shortening were combined and mixed together in advance to give a premix, then the premix was kneaded while adding water, shortening was added thereto, then the mixture was kneaded and mixed at a kneading temperature of 22° C., followed by flooring for a floor time of 10 minutes, division into pieces each having a weight of 280 g, further benching for a bench time of 5 minutes, passing the pieces through a molder and freezing at −40° C. for one hour to give frozen baker's dough.

After storing the frozen baker's dough in a freezer maintained at −22° C. for 4 weeks, the frozen dough was thawed by allowing to stand at 15° C. for 7 hours using a retarder, followed by making them round into balls, benching for a bench time of 10 minutes, shaping into loaves using a molder, proofing at 38° C. for 70 minutes, baking them at 175° C. for 15 minutes using a gas-convection oven to give bread (one loaf). The resulting bread was evaluated according to the following methods. The results thus obtained are summarized in the following Table 2 along with the sample used.

<Volume of Bread>

The volume of bread is determined by the rapeseed-substitution method and the resulting volume is divided by the weight of the bread to obtain the specific volume thereof.

<Outer Phase, Inner phase, Taste and Texture>

These items were evaluated on the basis of the following 4-stage evaluation criteria:

⊚: good;
○: rather good;
Δ: rather unsatisfactory;
×: bad

TABLE 2

| Sample | Sample No. Used | Specific Vol. of Bread (ml/g) | Sensory Evaluation | | |
|---|---|---|---|---|---|
| | | | Crust | Crumb | Taste and Texture |
| Control | — | 4.1 | Δ | Δ | × |
| Comp. Ex. | 1 | 4.0 | Δ | Δ | × |
| Example | 2 | 4.6 | ○ | ○ | ○ |
| Example | 3 | 4.8 | ⊚ | ⊚ | ⊚ |
| Example | 4 | 5.0 | ⊚ | ⊚ | ⊚ |
| Example | 5 | 4.6 | ○ | ○ | ○ |
| Example | 6 | 4.7 | ⊚ | ⊚ | ○ |
| Example | 7 | 4.7 | ⊚ | ⊚ | ○ |
| Comp. Ex. | 8 | 4.0 | Δ | Δ | Δ |
| Comp. Ex. | 9 | 4.1 | ○ | Δ | Δ |
| Comp. Ex. | 10 | 3.8 | Δ | Δ | × |

EXAMPLE 2

Bread (one loaf) was prepared by repeating the same procedures used in Example 1 except that the sample No. 4 and "Glucozym DB"® (available from Nagase Biochemical Industries Co., Ltd.) were used as the processed starch and the starch decomposition enzyme, respectively in amounts detailed in the following Table 3 and that the added amount of water was controlled to 67 parts+(amount of the processed starch)×3 parts. The results thus obtained are summarized in Table 3.

TABLE 3

| | Amount of Processed Starch (part) | Amount of Enzyme* Added (Unit) | Specific Vol. of Bread (ml/g) | Sensory Evaluation | | |
|---|---|---|---|---|---|---|
| | | | | Crust | Crumb | Taste and Texture |
| Comp. Ex. | 0.5 | 500 | 4.4 | ○ | Δ | Δ |
| Example | 1.5 | 500 | 4.8 | ⊚ | ⊚ | ⊚ |
| Example | 3.0 | 500 | 5.0 | ⊚ | ⊚ | ⊚ |
| Example | 6.0 | 500 | 4.7 | ⊚ | ○ | ○ |
| Comp. Ex. | 8.0 | 500 | 4.4 | ○ | Δ | Δ |
| Comp. Ex. | 3.0 | — | 4.3 | Δ | Δ | Δ |
| Comp. Ex. | — | 500 | 4.3 | Δ | Δ | Δ |
| Comp. Ex. | 3.0 | 150 | 4.6 | ○ | Δ | Δ |
| Example | 3.0 | 400 | 4.9 | ⊚ | ⊚ | ⊚ |
| Example | 3.0 | 800 | 5.0 | ⊚ | ⊚ | ○ |
| Comp. Ex. | 3.0 | 1300 | 3.8 | Δ | Δ | × |

*Added units of the starch decomposition enzyme per 1 kg of the raw grain flour.

EXAMPLE 3

Bread (one loaf) was prepared by repeating the same procedures used in Example 1 except that the sample No. 4 was used as the processed starch and that hard wheat flour and super hard wheat flour were used as the raw grain flour in rates of blending detailed in the following Table 4, while the raw grain flour used in the control comprised hard wheat flour to which one part of vital gluten was added and each resulting bread was inspected for various properties in the same manner used in Example 1. The results thus obtained are summarized in Table 4. In this respect, the present invention encompasses the control, but the control is herein presented for the purpose of making clear the fact that the effect attained by the use of super hard wheat flour is not simply due to an increase in the content of gluten.

TABLE 4

| | Amount of hard Flour (part) | Amount of Super hard Flour (part) | Specific Vol. of Bread (ml/g) | Sensory Evaluation | | |
|---|---|---|---|---|---|---|
| | | | | Crust | Crumb | Taste and Texture |
| Control | 100 | — | 4.7 | ⊙ | ○ | ○ |
| Example | 100 | 0 | 4.6 | ⊙ | ○ | ○ |
| Example | 85 | 15 | 4.9 | ⊙ | ⊙ | ⊙ |
| Example | 70 | 30 | 4.9 | ⊙ | ⊙ | ⊙ |
| Example | 50 | 50 | 5.0 | ⊙ | ○ | ○ |

EXAMPLE 4

There were kneaded 88 parts of "Montparno"® specially designed for French bread (available from Showa Sangyo Co., Ltd.), 12 parts of super hard wheat flour: "Pioneer"® (available from Showa Sangyo Co., Ltd.), 2 parts of the processed starch (sample No. 4), 300 units (per 1 kg of the wheat flour) of Glucozym DB®, 2 parts of common salt, 0.3 part of malt extract, 0.02 part of ascorbic acid, 2.4 parts of yeast, 0.02 part of B.B.J. (available from S. Z. Lesaffre Company) and 68 parts of water at a kneading temperature of 24° C. followed by flooring at 28° C. and a humidity of 75% for a flooring time of 10 minutes, dividing into pieces each having 350 g, making them round into balls, benching them for a bench time of 10 minutes, passing through a molder and freezing at −40° C. for one hour to give frozen baker's dough. After storing the frozen dough in a freezer maintained at −22° C. for 4 weeks, the dough was thawed at 15° C. for 5 hours using a retarder, followed by making them round into balls, benching for a bench time of 30 minutes, shaping into loaves using a molder, proofing at 28° to 29° C. for 90 minutes, baking them at 240° C. for 25 minutes using an electric oven (using steam) to give French bread. The resulting bread had good quality and had excellent appearance, the volume of the bread, the crumb and taste and texture comparable to those observed for the French bread prepared through the integrated work without using any frozen dough.

EXAMPLE 5

Frozen dough for butter roll having the following formulation was prepared by the following production steps (in the following formulation, the rate of blending of each ingredient is expressed in terms of "part", except for that of the starch decomposition enzyme which is expressed in terms of the enzymatic unit per 1 kg of the raw wheat flour). After storing the dough for 4 weeks in the frozen state, it was thawed and baked to give butter rolls.

<Blending Rate>

| | |
|---|---|
| hard wheat flour: "Neon" ® (available from Showa Sangyo Co., Ltd.) | 90 |
| super hard wheat flour: "Pioneer" ® (available from Showa Sangyo Co., Ltd.) | 10 |
| processed starch (sample No. 3) | 2 |
| starch decomposition enzyme: "Kokulase" ® (available from Sankyo Co., Ltd.) | 700 |
| yeast food | 0.1 |
| ascorbic acid | 0.015 |
| fatty acid monoglyceride | 0.3 |
| sugar | 12 |
| common salt | 1.8 |
| skim milk powder | 2 |
| yeast | 6.4 |
| whole egg | 15 |
| margarine | 15 |
| water | 53.5 |

These ingredients were kneaded at a kneading temperature of 22° C., followed by flooring for a floor time of 10 minutes, passing the mixture through a molder, introducing it into a mold and freezing (at −40° C. for one hour) and storing at −22° C. in the frozen state. The frozen dough was thawed at 15° C. for 5 hours, followed by proofing at 38° C. for a proof time of 30 minutes and baking at 170° C. for 13 minutes to give butter rolls.

The resulting butter roll had excellent appearance, the volume of the bread, the crumb and taste and texture comparable to those observed for the butter roll prepared through the integrated work without using any frozen dough.

EXAMPLE 6

Frozen dough for whole wheat bread having the following formulation was prepared by the following production steps (in the following formulation, the rate of blending of each ingredient is expressed in terms of "part", except for that of the starch decomposition enzyme which is expressed in terms of the enzymatic unit per 1 kg of the raw grain flour). After storing the dough for 4 weeks in the frozen state, it was thawed and baked to give whole wheat bread.

<Blending Rate>

| | |
|---|---|
| graham flour "Graham" ® (available from Nippon Flour Mills Co., Ltd.) | 50 |
| hard wheat flour "Napoleon" ® (available from Nippon Flour Mills Co., Ltd.) | 35 |
| super hard wheat flour "Golden Yacht" ® (available from Nippon Flour Mills Co., Ltd.) | 15 |
| processed starch (sample No. 4) | 3 |
| starch decomposition enzyme "Glycozym DB" ® | 550 |
| yeast food | 0.1 |
| ascorbic acid | 0.01 |
| common salt | 2.2 |
| sugar | 6 |
| skim milk powder | 3 |
| shortening | 5 |
| yeast | 4.5 |
| water | 72 |

These ingredients were mixed and kneaded at a kneading temperature of 22° C., followed by flooring for a floor time of 10 minutes, dividing into pieces, passing them through a molder and freezing (at −40° C. for one hour). The frozen dough was thawed at 15° C. for 6 hours, followed by making round into balls, benching for a bench time of 10 minutes, shaping into loaves by passing through a molder, proofing at 37° C. for a proof time of 50 minutes and baking to give whole wheat bread.

The resulting whole wheat bread had excellent appearance, the volume of the bread, the crumb and taste and texture comparable to those observed for the whole wheat bread (comprising 50 parts of graham flour) prepared through the integrated work without using any frozen dough.

EXAMPLE 7

Frozen dough for yeast leavened doughnuts having the following formulation was prepared by the following production steps (in the following formulation, the rate of blending of each ingredient is expressed in terms of "part", except for that of the starch decomposition enzyme which is expressed in terms of the enzymatic unit per 1 kg of the raw grain flour). After storing the dough for 4 weeks in the frozen state, it was thawed and fried to give yeast leavened doughnuts.

| <Blending Rate> | |
| --- | --- |
| hard wheat flour "Camellia" ® (available from Nissin Flour Mills Co., Ltd.) | 60 |
| super hard wheat flour "King" ® (available from Nissin Flour Mills Co., Ltd.) | 10 |
| soft flour "Flower" ® (available from Nissin Flour Mills Co., Ltd.) | 30 |
| processed starch (sample No. 3) | 2 |
| starch decomposition enzyme "Soft Dough-K" ® (available from Sankyo Foods Co., Ltd.) | 300 |
| sugar | 12 |
| common salt | 1.5 |
| skim milk powder | 2 |
| baking powder | 1 |
| whole egg | 10 |
| yeast | 5 |
| shortening | 10 |
| water | 53 |

These ingredients were mixed and kneaded at a kneading temperature of 23° C., followed by flooring for a floor time of 10 minutes, passing the mixture through a molder to form dough having a thickness of 1 cm, stamping out the sheet-like dough using a doughnuts mold having an outer diameter of 68 mm and an inner diameter of 32 mm and freezing (at −40° C. for one hour). The frozen dough was thawed at 30° C. for 60 minutes, followed by proofing at 38° C. and a humidity of 65% for a proof time of 30 minutes and frying at 180° C. initially for 70 seconds and then 60 seconds after turning round to give yeast leavened doughnuts.

The resulting doughnuts had excellent quality and had the appearance, the volume of the doughnuts, the crumb and taste and texture comparable to those observed for the yeast leavened doughnuts prepared through the integrated work without using any frozen dough.

EXAMPLE 8

Frozen dough for pizza having the following formulation was prepared by the following production steps (in the following formulation, the rate of blending of each ingredient is expressed in terms of "part", except for that of the starch decomposition enzyme which is expressed in terms of the enzymatic unit per 1 kg of the raw grain flour). After storing the dough for 4 weeks in the frozen state, it was thawed and baked to give pizza.

| <Blending Rate> | |
| --- | --- |
| hard wheat flour "Camellia" ® (available from Nissin Flour Mills Co., Ltd.) | 50 |
| super hard wheat flour "King" ® (available from Nissin Flour Mills Co., Ltd.) | 10 |
| soft flour "Flower" ® (available from Nissin Flour Mills Co., Ltd.) | 40 |
| processed starch (sample No. 4) | 2.5 |
| starch decomposition enzyme "Malt Powder" ® (available from Oriental Yeast Co., Ltd.) | 400 |
| sugar | 4 |
| common salt | 1.5 |
| skim milk powder | 5 |
| yeast | 4 |
| shortening | 7 |
| water | 71 |

These ingredients were mixed and kneaded at a kneading temperature of 25° C., followed by flooring for a floor time of 10 minutes, dividing into pieces, spreading and shaping each piece into a disk-like shape while punching the same and freezing (at −40° C. for one hour). The frozen dough was thawed at 15° C. for 3 hours, followed by proofing at 38° C. and a humidity ranging from 80 to 85% for a proof time of 30 minutes, subjecting the dough to a topping treatment and baking to give pizza.

The resulting pizza had excellent quality and had the appearance, the crumb and taste and texture comparable to those observed for the pizza prepared through the integrated work without using any frozen dough.

What is claimed is:

1. A method for preparing frozen baker's dough which comprises the steps of blending ingredients for preparing bread including raw grain flour comprising 10 to 40% by weight of wheat flour having a protein content of not less than 14% by weight, 1 to 7 parts by weight of a processed starch per 100 parts by weight of the raw grain flour and 300 to 1000 units of a starch decomposition enzyme per 1 kg of the raw grain flour, the processed starch having a hot water solubility of not more than 8% by weight, a ratio of cold water swelling power to hot water swelling power ranging from 1.2 to 0.8 and a cold water swelling power ranging from 4 to 15, to thereby form a mixture;

kneading the mixture while adding water to form a dough; and then freezing the dough.

2. The method for preparing frozen baker's dough of claim 1 wherein the processed starch is one prepared from at least one starch selected from the group consisting of potato starch, sweet potato starch and sago starch and has a hot water solubility of not more than 6% by weight and a cold water swelling power ranging from 6 to 12.

3. The method for preparing frozen baker's dough of claim 1 wherein the processed starch comprises not more than 5% by weight of a fraction which does not pass through a 250 micrometer test sieve.

4. The method for preparing frozen baker's dough of claim 1 wherein the processed starch is added in an amount ranging from 1 to 5 parts by weight per 100 parts by weight of the raw grain flour.

5. The method for preparing frozen baker's dough of claim 1 wherein the starch decomposition enzyme is added in an amount ranging from 300 to 800 units per 1 kg of the raw grain flour.

6. The method for preparing frozen baker's dough of claim 1 wherein the processed starch and the starch decomposition enzyme are added to the ingredients by forming a premix with at least one ingredient or a part thereof prior to the addition thereof to other ingredients.

7. The method for preparing frozen baker's dough of claim 1 wherein the processed starch and the starch decomposition enzyme are added to the ingredients by simultaneously combining and mixing all of the ingredients including the processed starch and the enzyme or by adding and mixing, in order, the ingredients.

8. The method for preparing frozen baker's dough of claim 1 wherein the added amount of water is greater than that required in a dough-forming method, wherein the processed starch is not used, by about 3 to 4 parts by weight per one part by weight of the processed starch.

9. The method for preparing frozen baker's dough of claim 1 wherein the freezing is carried out at a temperature ranging from −35° to −45° C.

* * * * *